United States Patent
Sonenblick et al.

(10) Patent No.: US 10,469,909 B1
(45) Date of Patent: Nov. 5, 2019

(54) SYSTEMS AND METHODS FOR PROVIDING ACCESS TO STILL IMAGES DERIVED FROM A VIDEO

(71) Applicant: GOPRO, INC., San Mateo, CA (US)

(72) Inventors: Ando Sonenblick, Carlsbad, CA (US); Daniel Defenbaugh, San Diego, CA (US); Ian Miller, San Diego, CA (US); Tyler Gee, San Francisco, CA (US)

(73) Assignee: GoPro, Inc., San Mateo, CA (US)

( * ) Notice: Subject to any disclaimer, the term of this patent is extended or adjusted under 35 U.S.C. 154(b) by 388 days.

(21) Appl. No.: 15/210,849

(22) Filed: Jul. 14, 2016

(51) Int. Cl.
| | |
|---|---|
| *H04N 21/4788* | (2011.01) |
| *H04N 7/16* | (2011.01) |
| *H04N 21/472* | (2011.01) |
| *H04N 21/2743* | (2011.01) |
| *H04N 21/258* | (2011.01) |
| *H04N 21/643* | (2011.01) |
| *H04N 21/475* | (2011.01) |
| *H04N 21/4402* | (2011.01) |
| *H04N 21/8547* | (2011.01) |
| *H04N 21/442* | (2011.01) |

(52) U.S. Cl.
CPC . *H04N 21/47205* (2013.01); *H04N 21/25891* (2013.01); *H04N 21/2743* (2013.01); *H04N 21/44029* (2013.01); *H04N 21/44222* (2013.01); *H04N 21/440281* (2013.01); *H04N 21/4758* (2013.01); *H04N 21/4788* (2013.01); *H04N 21/64322* (2013.01); *H04N 21/8547* (2013.01)

(58) Field of Classification Search
CPC .................................................. H04N 21/4728
See application file for complete search history.

(56) References Cited

U.S. PATENT DOCUMENTS

| | | |
|---|---|---|
| 7,222,356 B1 | 5/2007 | Yonezawa |
| 7,483,618 B1 | 1/2009 | Edwards |
| 7,681,223 B2 | 3/2010 | Takahashi |
| (Continued) | | |

FOREIGN PATENT DOCUMENTS

WO     2009040538     4/2009

OTHER PUBLICATIONS

FFmpeg, "Demuxing," Doxygen, Dec. 5, 2014, 15 Pages, [online] [retrieved on Jul. 13, 2015] Retrieved from the internet <URL:https://www.ffmpeg.org/doxygen/2.3/group_lavf_encoding.html>.

(Continued)

*Primary Examiner* — Mushfikh I Alam
(74) *Attorney, Agent, or Firm* — Esplin & Associates, PC

(57) ABSTRACT

Multiple video segments may be obtained from a repository of video segments. A selection of a video segment from the multiple video segments may be received. The selected video segment may be presented at a first resolution via a display. A selection of a point in time during presentation of the video segment may be received to extract a frame set from the video segment at or near the selected point in time. The frame set may include multiple frames, including one frame corresponding to the selected point in time, and other frames that correspond to points in time adjacent to the selected point in time. A selection of a single frame within the frame set may be received. The single frame may be received having a second resolution. The second resolution may be higher than the first resolution. The single frame may be presented via the display.

18 Claims, 7 Drawing Sheets

(56) References Cited

U.S. PATENT DOCUMENTS

| | | | |
|---|---|---|---|
| 8,446,433 B1 | 5/2013 | Mallet | |
| 8,611,422 B1 | 12/2013 | Yagnik | |
| 8,718,447 B2 | 5/2014 | Yang | |
| 8,763,023 B1 | 6/2014 | Goetz | |
| 9,077,956 B1 | 7/2015 | Morgan | |
| 9,253,533 B1 | 2/2016 | Morgan | |
| 9,456,248 B2* | 9/2016 | Laksono | H04N 7/163 |
| 2004/0128317 A1 | 7/2004 | Sull | |
| 2005/0025454 A1 | 2/2005 | Nakamura | |
| 2005/0060365 A1 | 3/2005 | Robinson | |
| 2006/0156219 A1 | 7/2006 | Haot | |
| 2006/0245504 A1* | 11/2006 | Ogikubo | G11B 27/105 375/240.25 |
| 2007/0002946 A1 | 1/2007 | Bouton | |
| 2007/0018952 A1* | 1/2007 | Arseneau | G06F 1/1626 345/156 |
| 2007/0086669 A1* | 4/2007 | Berger | G06K 9/2081 382/243 |
| 2007/0106419 A1 | 5/2007 | Rachamadugu | |
| 2007/0168543 A1 | 7/2007 | Krikorian | |
| 2007/0204310 A1 | 8/2007 | Hua | |
| 2007/0230461 A1 | 10/2007 | Singh | |
| 2008/0044155 A1 | 2/2008 | Kuspa | |
| 2008/0123976 A1 | 5/2008 | Coombs | |
| 2008/0152297 A1 | 6/2008 | Ubillos | |
| 2008/0163283 A1 | 7/2008 | Tan | |
| 2008/0177706 A1 | 7/2008 | Yuen | |
| 2008/0253735 A1 | 10/2008 | Kuspa | |
| 2008/0313541 A1 | 12/2008 | Shafton | |
| 2009/0213270 A1 | 8/2009 | Ismert | |
| 2010/0086216 A1 | 4/2010 | Lee | |
| 2010/0104261 A1 | 4/2010 | Liu | |
| 2010/0183280 A1 | 7/2010 | Beauregard | |
| 2010/0231730 A1 | 9/2010 | Ichikawa | |
| 2010/0245626 A1 | 9/2010 | Woycechowsky | |
| 2010/0251295 A1 | 9/2010 | Amento | |
| 2010/0278504 A1 | 11/2010 | Lyons | |
| 2010/0278509 A1 | 11/2010 | Nagano | |
| 2010/0281375 A1 | 11/2010 | Pendergast | |
| 2010/0281386 A1 | 11/2010 | Lyons | |
| 2010/0295966 A1* | 11/2010 | Furlan | H04N 5/232 348/231.2 |
| 2010/0318660 A1 | 12/2010 | Balsubramanian | |
| 2010/0332131 A1* | 12/2010 | Horvitz | G01C 21/3484 701/414 |
| 2011/0075990 A1 | 3/2011 | Eyer | |
| 2011/0093605 A1 | 4/2011 | Choudhury | |
| 2011/0093798 A1 | 4/2011 | Shahraray | |
| 2011/0150433 A1* | 6/2011 | Alexandrov | H04N 5/91 386/328 |
| 2011/0206351 A1 | 8/2011 | Givoly | |
| 2011/0285866 A1* | 11/2011 | Bhrugumalla | H04N 5/23232 348/218.1 |
| 2011/0293250 A1 | 12/2011 | Deever | |
| 2012/0027381 A1 | 2/2012 | Kataoka | |
| 2012/0030029 A1 | 2/2012 | Flinn | |
| 2012/0057852 A1 | 3/2012 | Devleeschouwer | |
| 2012/0123780 A1 | 5/2012 | Gao | |
| 2012/0192225 A1 | 7/2012 | Harwell | |
| 2012/0198319 A1 | 8/2012 | Agnoli | |
| 2012/0311448 A1 | 12/2012 | Achour | |
| 2013/0041948 A1 | 2/2013 | Tseng | |
| 2013/0104177 A1 | 4/2013 | Kwan | |
| 2013/0136193 A1 | 5/2013 | Hwang | |
| 2013/0151970 A1 | 6/2013 | Achour | |
| 2013/0166303 A1 | 6/2013 | Chang | |
| 2013/0185388 A1 | 7/2013 | Mackie | |
| 2013/0195429 A1 | 8/2013 | Fay | |
| 2013/0197967 A1 | 8/2013 | Pinto | |
| 2013/0208942 A1 | 8/2013 | Davis | |
| 2013/0222583 A1 | 8/2013 | Earnshaw | |
| 2013/0259399 A1 | 10/2013 | Ho | |
| 2013/0283301 A1 | 10/2013 | Avedissian | |
| 2013/0287214 A1 | 10/2013 | Resch | |
| 2013/0300939 A1 | 11/2013 | Chou | |
| 2013/0318443 A1 | 11/2013 | Bachman | |
| 2013/0343727 A1 | 12/2013 | Rav-Acha | |
| 2014/0072285 A1 | 3/2014 | Shynar | |
| 2014/0093164 A1 | 4/2014 | Noorkami | |
| 2014/0096002 A1 | 4/2014 | Dey | |
| 2014/0105573 A1 | 4/2014 | Hanckmann | |
| 2014/0161351 A1 | 6/2014 | Yagnik | |
| 2014/0165119 A1 | 6/2014 | Liu | |
| 2014/0169766 A1 | 6/2014 | Yu | |
| 2014/0212107 A1 | 7/2014 | Saint-Jean | |
| 2014/0219634 A1 | 8/2014 | McIntosh | |
| 2014/0226953 A1 | 8/2014 | Hou | |
| 2014/0232818 A1 | 8/2014 | Carr | |
| 2014/0245336 A1 | 8/2014 | Lewis, II | |
| 2014/0300644 A1 | 10/2014 | Gillard | |
| 2014/0328570 A1 | 11/2014 | Cheng | |
| 2014/0340465 A1* | 11/2014 | Shi | H04N 7/15 348/14.03 |
| 2014/0341527 A1 | 11/2014 | Hurley | |
| 2014/0341528 A1 | 11/2014 | Mahate | |
| 2014/0366052 A1 | 12/2014 | Ives | |
| 2015/0015680 A1 | 1/2015 | Wang | |
| 2015/0022355 A1 | 1/2015 | Pham | |
| 2015/0029089 A1 | 1/2015 | Kim | |
| 2015/0054975 A1* | 2/2015 | Emmett | H04N 5/23245 348/220.1 |
| 2015/0186073 A1 | 7/2015 | Pacurariu | |
| 2015/0281710 A1 | 10/2015 | Sievert | |
| 2015/0287435 A1 | 10/2015 | Land | |
| 2015/0318020 A1 | 11/2015 | Pribula | |
| 2015/0350565 A1* | 12/2015 | Rapport | H04N 19/44 348/581 |
| 2015/0375117 A1 | 12/2015 | Thompson | |
| 2015/0382083 A1 | 12/2015 | Chen | |
| 2016/0005440 A1 | 1/2016 | Gower | |
| 2016/0026874 A1 | 1/2016 | Hodulik | |
| 2016/0027470 A1 | 1/2016 | Newman | |
| 2016/0027475 A1 | 1/2016 | Hodulik | |
| 2016/0029105 A1 | 1/2016 | Newman | |
| 2016/0055885 A1 | 2/2016 | Hodulik | |
| 2016/0212329 A1* | 7/2016 | Choe | H04N 5/23245 |
| 2016/0225405 A1 | 8/2016 | Matias | |
| 2016/0225410 A1 | 8/2016 | Lee | |
| 2016/0234345 A1 | 8/2016 | Roberts | |
| 2016/0300594 A1 | 10/2016 | Allen | |
| 2016/0358603 A1 | 12/2016 | Azam | |
| 2016/0366330 A1 | 12/2016 | Boliek | |

OTHER PUBLICATIONS

PCT International Search Report and Written Opinion for PCT/US2015/023680, dated Oct. 6, 2015, 13 pages.

PCT International Written Opinion for PCT/US2015/041624, dated Dec. 17, 2015, 7 Pages.

PCT International Search Report for PCT/US15/41624 dated Nov. 4, 2015, 5 pages.

PCT International Search Report for PCT/US15/23680 dated Aug. 3, 2015, 4 pages.

PCT International Preliminary Report on Patentability for PCT/US2015/023680, dated Oct. 4, 2016, 10 pages.

PCT International Search Report and Written Opinion for PCT/US15/12086 dated Mar. 17, 2016, 20 pages.

FFmpeg, "Muxing," Doxygen, Jul. 20, 2014, 9 Pages, [online] [retrieved on Jul. 13, 2015] Retrieved from the internet <URL: https://www.ffmpeg.org/doxyg en/2. 3/structA VP a ck et. html>.

FFmpeg, "AVPacket Struct Reference," Doxygen, Jul. 20, 2014, 24 Pages, [online] [retrieved on Jul. 13, 2015] Retrieved from the internet <URL:https://www.ffmpeg.org/doxygen/2.5/group_lavf_decoding.html>.

Iandola et al., "SqueezeNet: AlexNet-level accuracy with 50× fewer parameters and <0.5MB model size", arXiv:1602.07360v3 [cs.CV] Apr. 6, 2016 (9 pgs.).

Yang et al., "Unsupervised Extraction of Video Highlights Via Robust Recurrent Auto-encoders" arXiv:1510.01442v1 [cs.CV] Oct. 6, 2015 (9 pgs).

(56) References Cited

OTHER PUBLICATIONS

Tran et al., "Learning Spatiotemporal Features with 3D Convolutional Networks", arXiv:1412.0767 [cs.CV] Dec. 2, 2014 (9 pgs).
Schroff et al., "FaceNet: A Unified Embedding for Face Recognition and Clustering," IEEE Conference on Computer Vision and Pattern Recognition (CVPR), 2016, 10 pgs.
Parkhi et al., "Deep Face Recognition," Proceedings of the British Machine Vision, 2015, 12 pgs.
Iandola et al., "SqueezeNet: AlexNet-level accuracy with 50× fewer parameters and <0.5MB model size," arXiv:1602.07360, 2016, 9 pgs.
Ioffe et al., "Batch Normalization: Accelerating Deep Network Training by Reducing Internal Covariate Shift," arXiv:1502.03167, 2015, 11 pgs.
He et al., "Deep Residual Learning for Image Recognition," arXiv:1512.03385, 2015, 12 pgs.
Han et al., Deep Compression: Compressing Deep Neural Networks with Pruning, Trained Quantization and Huffman Coding, International Conference on Learning Representations 2016, 14 pgs.
Ernoult, Emeric, "How to Triple Your YouTube Video Views with Facebook", SocialMediaExaminer.com, Nov. 26, 2012, 16 pages.

\* cited by examiner

SYSTEMS AND METHODS FOR PROVIDING ACCESS TO STILL IMAGES DERIVED FROM A VIDEO

FIELD

The disclosure relates to providing access to still images derived from video being viewed by a user.

BACKGROUND

Videos may be captured in high definition and/or resolution. Content of the video may be captured with a high frame rate. The frame rate may refer to a number of frames (e.g., images) captured per second to compose the video. Videos may be captured in high resolution, but storage space on viewing devices may be limited.

SUMMARY

One aspect of the disclosure relates to providing access to still images derived from video being viewed by a user, in accordance with one or more implementations. A video segment may be captured in high definition and/or low resolution. Resolution and/or definition may refer to a number of pixels within still images and/or frames that may compose a moving picture of the video segment. A user may wish to extract and/or view a high quality image and/or frame (e.g., high resolution image) from the previously captured video segment at a client computing platform (e.g., a smartphone, computer, etc.). In order to reduce local storage space on the client computing platform, the system may present a low resolution version of the originally captured video segment via a display associated with the client computing platform. That is, the video segment may be stored within a storage device external to the client computing platform. As such, the system may provide the low resolution version of the originally captured video segment from a server to the client computing platform for presentation. The user may select a point in time within the low resolution version of the video segment during presentation of the low resolution version of the video segment to extract a frame set. The frame set may include multiple frames captured at or near the point in time of the video segment. The frame set may be received by the system from the original version of the video segment, which may be stored external to the client computing platform. The original version of the video segment may include a higher frame rate than that of the low resolution version of the video segment. The system may present the frame set to the user via a display associated with one or more client computing platforms that the user may be using. The user may view the various frames included within the frame set. The system may continue to receive additional frames as the user scrolls through the individual frames within the frame set. The user may select a single frame from the frame set to extract and/or view a high quality image of the single frame. A high quality image of the frame may be extracted and/or received by the system and presented for the user via the display associated with the client computing platform. The user may then store the high quality image of the frame to a local storage device of the client computing platform.

In some implementations, the system may include one or more servers. The server(s) may be configured to communicate with one or more client computing platforms according to a client/server architecture. The users of the system may access the system via client computing platform(s). The server(s) may be configured to execute one or more computer program components. The computer program components may include one or more of a video segment component, an authentication component, a presentation component, a selection component, a frame component, and/or other components.

The video segment component may be configured to obtain multiple video segments. Multiple video segments may include more than one video segment. The multiple video segments may be included within a repository of video segments. A repository of images and/or video segments may be available via the system. The repository of images and/or video segments may be stored within an electronic storage, one or more servers, one or more client computing platforms, external resources, a cloud, and/or any other storage location. Individual images and/or video segments of the repository of images and/or video segments may be stored in different locations. The repository of images and/or video segments may be associated with different users. The video segments may include a compilation of videos, video segments, video clips, and/or still images.

The authentication component may be configured to authenticate a user associated with client computing platforms accessing the repository of images and/or video segments via the system. The authentication component may manage accounts associated with users and/or consumers of the system. The user accounts may include user information associated with users and/or consumers of the user accounts. User information may include information stored by servers, client computing platforms, and/or other storage locations.

The presentation component may be configured to effectuate presentation, via a display associated with a client computing platform, of the multiple video segments. In some embodiments, the presentation component may be configured to effectuate transmission of the multiple video segments to the client computing platform for presentation. A user, upon authentication, may consume the multiple video segments by viewing the video segments via client computing platforms and/or an associated display device (e.g., a monitor, a touchscreen of a smartphone, etc). Client computing platforms may include one or more display devices configured to display the video segments.

The selection component may be configured to receive a selection, via the client computing platform, of the video segment from the multiple video segments. The selection may be received from the user via the client computing platform. The user may select the video segment via a mouse, a touch on and/or near a touchscreen of a smartphone, and/or may select the video segment in other ways. The selection component may be configured to receive a selection for more than one video segment from the multiple video segments. The video segment may include a frame rate. The frame rate may refer to a number of frames (e.g., images) captured per second which compose the video. The frame rate of the high definition and/or original quality video, as discussed above, may include 60, 80, 120, and/or other number of frames per second.

The presentation component may be configured to effectuate presentation, via the display associated with one or more client computing platforms, of the selected video segment. In some embodiments, the presentation component may be configured to effectuate transmission of the selected video segment to the client computing platform for presentation. The video segment may be presented at a first resolution. The video segment that may be presented at the first resolution may include a low resolution video. The low resolution video may be of a lower resolution than the high definition and/or original quality video referred to above. For example, if the video segment was captured in 1080p, then the low resolution video may include 720p. In some embodiments, the selected video segment may be presented (e.g., the low resolution video) at a first frame rate. The first frame rate may include 30 frames per second. This is for exemplary purposes only and is not meant to be a limitation of this disclosure. In this manner, the system may be configured to retrieve the selected video segment from a storage location in which the selected video segment is stored. The presentation component may be configured to effectuate presentation (and/or effectuate transmission of the video segment to the one or more client computing platforms for presentation) of the video segment at a lower resolution than originally captured such that a user may view the lower resolution video via the display associated with one or more client computing platforms.

The selection component may be configured to receive a selection, via one or more client computing platforms associated with the display upon which the selected video segment may be displayed, of a point in time during presentation of the video segment to extract a frame set from the video segment at or near the selected point in time. The selection of the point in time may be during the duration of the video segment. For example, as the user views the video segment at the first resolution, the user may wish to view still images (e.g., frames) at or near a particular point in time during the video segment.

The frame component may be configured to receive the frame set. The frame set may include multiple frames. The frame set may include one frame corresponding to the selected point in time and at least one other frame that corresponds to points in time adjacent to the selected point in time. The frame component may be configured to receive the frame set from the original video segment (e.g., the original quality video). The original video segment may include a second frame rate. The second frame rate may be a higher frame rate than the first frame rate (e.g., the frame rate of the selected video segment as presented that the user may be viewing via the display of one or more client computing platform). The presentation component may be configured to resize and/or shrink the frames (e.g., images) after receiving them to avoid taking up too much storage space on the servers and/or client computing platforms, and/or to alter the frames (e.g., images) such that they are viewable via one or more client computing platforms (e.g., based upon the particular device, etc.). The presentation component may be configured to effectuate presentation, via the display associated with one or more client computing platforms, of the frame set. In some embodiments, the presentation component may be configured to effectuate transmission of the frame set to the client computing platform for presentation.

The selection component may be configured to receive a user selection, via one or more client computing platforms, to advance and/or reverse through the individual frames of the frame set. The selection to advance and/or reverse through the individual frames of the frame set may include a selection of a button (e.g., via a mouse, a tap on or near a touch sensitive display, and/or other device associated with one or more client computing platform) to advance and/or reverse through the individual frames of the frame set, detection of a swiping motion on or near a top surface of a touch sensitive display of one or more client computing platforms, and/or other selections to indicate that the user would like to view other frames included within the frame set. In response to the user selection to advance through the individual frames, the selection component may be configured to advance and/or reverse through the individual frames included within the frame set.

In response to advancing and/or reversing through the individual frames of the frame set, the frame component may be configured to receive additional frames after and adjacent to the multiple frames included within the frame set and/or before and adjacent to the multiple frames included within the frame set. In response to the user selection to advance and/or reverse through the individual frames, the system may be configured to prepare for the user advancing through more of the individual frames of the frame set. For example, if the selection component receives a user selection from one or more client computing platforms to advance through 3 frames within the frame set, the frame component may be configured to receive 3 additional frames after and adjacent to the frames included within the frame set. In some embodiments, for every frame the user advances through within the frame set, the frame component may be configured to receive 2, 5, or any other number of additional frames after and adjacent to the frames included within the frame set. In this manner, the frames of the original video segment may be "fetched" by the frame component such that the individual frames may not take up unnecessary storage space within servers and/or one or more client computing platforms in response to a user's action to view additional frames in the same "direction" (e.g., advancing through frames to the right of the selected point in time, for example). Additionally, the user may not reach the end of the frame set because additional frames may continually be received by the frame component in anticipation to display in case the user continues to advance through frames of the frame set.

The selection component may be configured to receive a selection, via one or more client computing platforms, of a single frame from within the frame set. The selection may be made by the user by selecting the single frame via a mouse, a tap on or near a touch sensitive display, and/or other device (e.g., stylus) associated with one or more client computing platforms. The selection of the single frame may indicate to the system that the user would like to view a high quality image of that particular selection frame of the video segment.

The frame component may be configured to receive the single frame. The single frame may be received from a storage location where the original video segment may be stored (e.g., remotely). In this manner, full size images of the frames of the video segment may not be stored on servers and/or client computing platforms. The single frame may have a second resolution. The second resolution may be higher than the first resolution. That is, the single frame received by the frame component may have a higher resolution than the video segment received by the video segment component. The single frame received by the frame component may have a higher resolution than the individual frames included within the frame set. As such, the single frame received by the frame component may be considered and/or referred to as a "high quality" image, as the resolution of the single frame may be higher than the presented video segment, the individual frames presented within the frame set, and/or other images/frames/video segments presented to the user via the display associated with one or more client computing platforms.

The presentation component may be configured to effectuate presentation, via the display associated with one or more client computing platforms, of the single frame. In some embodiments, the presentation component may be configured to effectuate transmission of the single frame to the client computing platform for presentation. The user may view the high quality image (e.g., the single frame) via the display associated with one or more client computing platforms. The presentation component may be configured to effectuate presentation, via the display associated with one or more client computing platforms, of sharing options for the user to share the high quality image (e.g., the single frame). In some embodiments, the presentation component may be configured to effectuate transmission of the sharing options to the one or more client computing platforms for presentation.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
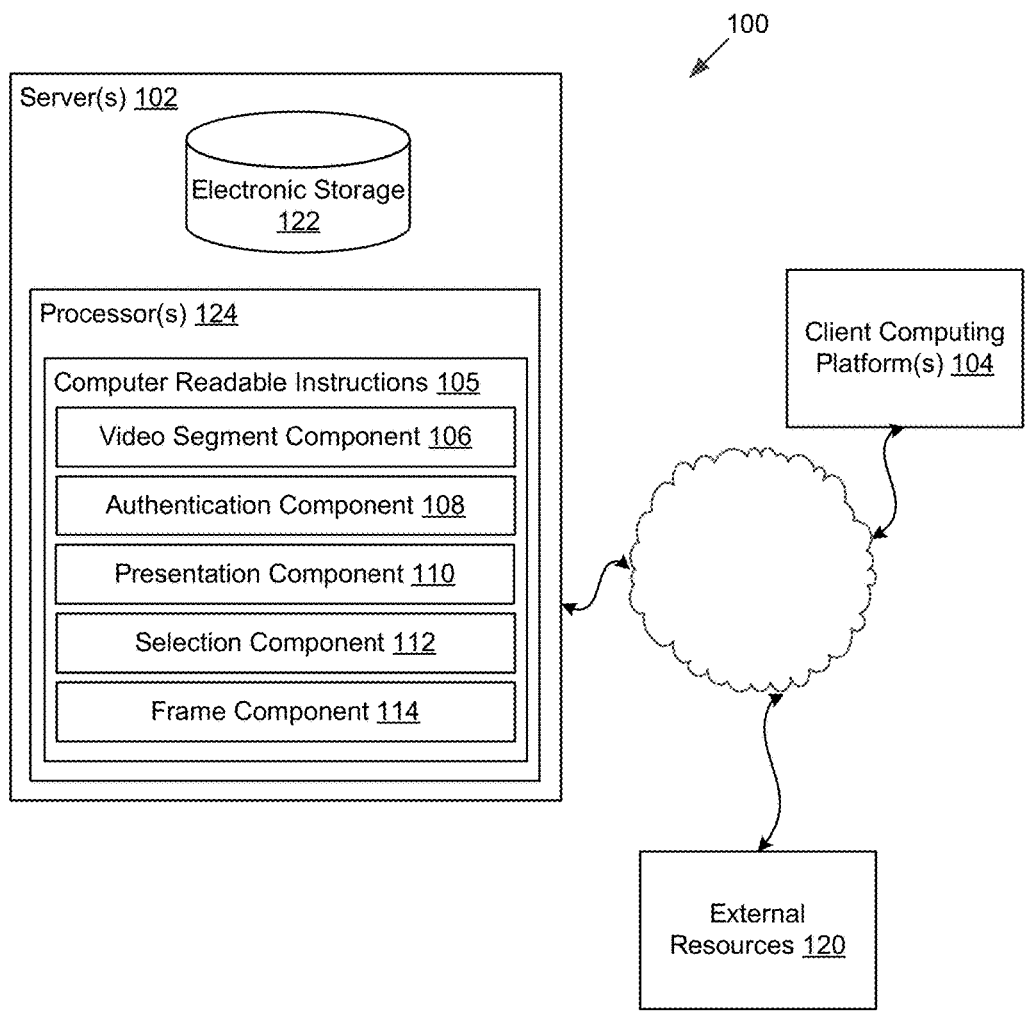
FIG. 1 illustrates a system for providing access to still images derived from video being viewed by a user, in accordance with one or more implementations.

FIG. 1 illustrates a system 100 for providing access to still images derived from video being viewed by a user, in accordance with one or more implementations. A video segment may be captured in high definition and/or low resolution. Resolution and/or definition may refer to a number of pixels within still images and/or frames that may compose a moving picture of the video segment. A user may wish to extract and/or view a high quality image and/or frame (e.g., high resolution image) from the previously captured video segment at client computing platform 104 (e.g., a smartphone, computer, etc.). In order to reduce local storage space on client computing platform 104, system 100 may present a low resolution version of the originally captured video segment via a display associated with client computing platform 104. That is, the video segment may be stored within a storage device external to client computing platform 104. As such, system 100 may provide the low resolution version of the originally captured video segment from server(s) 102 to client computing platform 104 for presentation. The user may select a point in time within the low resolution version of the video segment during presentation of the low resolution version of the video segment to extract a frame set via client computing platform 104. The frame set may include multiple frames captured at or near the point in time of the video segment. The frame set may be received by system 100 from the original version of the video segment, which may be stored external to client computing platform 104. The original version of the video segment may include a higher frame rate than that of the low resolution version of the video segment. The system may present the frame set to the user via a display associated with one or more client computing platforms 104 that the user may be using. The user may view the various frames included within the frame set. System 100 may continue to receive additional frames as the user scrolls through the individual frames within the frame set. The user may select a single frame from the frame set to extract and/or view a high quality image of the single frame. A high quality image of the frame may be extracted and/or received by system 100 and presented for the user via the display associated with client computing platform 104. The user may then store the high quality image of the frame to a local storage device of client computing platform 104.

As is illustrated in FIG. 1, system 100 may include one or more server(s) 102. Server(s) 102 may be configured to communicate with one or more client computing platform(s) 104 according to a client/server architecture. The users of system 100 may access system 100 via client computing platform(s) 104. Server(s) 102 may be configured to execute one or more computer program components. The computer program components may include one or more of video segment component 106, authentication component 108, presentation component 110, selection component 112, frame component 114, and/or other components.

In some implementations, server(s) 102 may be configured to provide remote hosting of the features and/or function of machine-readable instructions 105 to one or more client computing platform(s) 104 that may be remotely located from server(s) 102. However, in some implementations, one or more features and/or functions of server(s) 102 may be attributed as local features and/or functions of one or more client computing platform(s) 104. For example, individual ones of client computing platform(s) 104 may include machine-readable instructions (not shown in FIG. 1) comprising the same or similar components as machine-readable instructions 105 of server(s) 102. Client computing platform (s) 104 may be configured to locally execute the one or more components that may be the same or similar to the machine-readable instructions 105. One or more features and/or functions of machine-readable instructions 105 of server(s) 102 may be provided, at least in part, as an application program that may be executed at a given client computing platform 104. For example, an image capturing device capturing a video segment may be configured to locally execute the one or more components that may be the same or similar to the machine-readable instructions 105 in or near real-time.

Client computing platform(s) 104 may include one or more of a cellular telephone, a smartphone, a digital camera, a laptop, a tablet computer, a desktop computer, a television set-top box, smart TV, a gaming console, and/or other computing platforms.

Server(s) 102, client computing platform(s) 104, and/or external resources 120 may be operatively linked via one or more electronic communication links. For example, such electronic communication links may be established, at least in part, via a network such as the Internet and/or other networks. It will be appreciated that this is not intended to be limiting and that the scope of this disclosure includes implementations in which server(s) 102, client computing platform(s) 104, and/or external resources 120 may be operatively linked via some other communication media.

Video segment component 106 may be configured to obtain multiple video segments. Multiple video segments may include more than one video segment. The multiple video segments may be included within a repository of video segments. A repository of images and/or video segments may be available via system 100. The repository of images and/or video segments may be stored within electronic storage 122, one or more server(s) 102, one or more client computing platform(s) 104, external resources 120, a cloud, and/or any other storage location. Individual images and/or video segments of the repository of images and/or video segments may be stored in different locations. The repository of images and/or video segments may be associated with different users. The video segments may include a compilation of videos, video segments, video clips, and/or still images. While the present disclosure may be directed to previously captured video segments captured by one or more image capturing devices, one or more other implementations of system 100, server(s) 102, and/or client computing platform(s) 104 may be configured for other types of media items. Other types of media items may include one or more of audio files (e.g., music, podcasts, audio books, and/or other audio files), multimedia presentations, slideshows, and/or other media files. The multiple video segments may be obtained from one or more storage locations associated with server(s) 102, client computing platform(s) 104, and/or other storage locations where video segments may be stored.

Individual video segments may have a duration of a length of time. Individual video segments may be composed of many still images, also known as frames. The frames may compose a moving picture, such as video content of a video segment. The video segment may include a playback of live captured video segment (e.g., captured via one or image capture devices).

The various video segments may be generated by various image capture devices. An image capture device may include a camera. The term camera may refer to any imaging device or sensor configured to capture, record, and/or convey still and/or video imagery, which may be sensitive to visible parts of the electromagnetic spectrum and/or invisible parts of the electromagnetic spectrum (e.g., infrared, ultraviolet, and/or other invisible ranges).

The video segments included within the multiple video segments may be captured as a high definition video. The high definition video may be referred to as an original quality video. The high definition and/or original quality video may include a resolution. The resolution may refer to a number of pixels in an image (e.g., a frame within the video). Resolution may often be referred to how wide the image is by the number of pixels and how high the image is by the number of pixels. Generally, a high definition video in North America may include still images (e.g., frames) with more than 480 horizontal lines. A high definition video in Europe may include still images (e.g., frames) with more than 576 horizontal lines. High definition resolutions may include 1080p, 960p, 720p, and/or other high definition resolutions.

Authentication component 108 may be configured to authenticate a user associated with client computing platform(s) 104 accessing the repository of images and/or video segments via system 100. Authentication component 108 may manage accounts associated with users and/or consumers of system 100. The user accounts may include user information associated with users and/or consumers of the user accounts. User information may include information stored by server(s) 102, client computing platform(s) 104, and/or other storage locations.

User information may include one or more of information identifying users and/or consumers (e.g., a username or handle, a number, an identifier, and/or other identifying information), security login information (e.g., a login code or password, a user ID, and/or other information necessary for the user to access server(s) 102), system usage information, external usage information (e.g., usage of one or more applications external to system 100 including one or more of online activities such as in social networks and/or other external applications), subscription information, a computing platform identification associated with the user and/or consumer, a phone number associated with the user and/or consumer, privacy settings information, and/or other information related to users and/or consumers.

Authentication component 108 may be configured to obtain user information via one or more client computing platform(s) 104 (e.g., user input via a user interface, etc.). If a user and/or consumer does not have a preexisting user account associated with system 100, a user and/or consumer may register to receive services provided by system 100 via a website, web-based application, mobile application, and/or user application. Authentication component 108 may be configured to create a user ID and/or other identifying information for a user and/or consumer when the user and/or consumer registers. The user ID and/or other identifying information may be associated with one or more client computing platform(s) 104 used by the user and/or consumer. Authentication component 108 may be configured to store such association with the user account of the user and/or consumer. A user and/or consumer may associate one or more accounts associated with social network services, messaging services, and the like with an account provided by system 100.

Presentation component 110 may be configured to effectuate presentation, via a display associated with one or more client computing platform(s) 104, of the multiple video segments. In some embodiments, presentation component 110 may be configured to effectuate transmission of the multiple video segments to one or more client computing platform(s) 104 for presentation. A user, upon authentication, may consume the multiple video segments by viewing the video segments via client computing platform(s) 104 and/or an associated display device (e.g., a monitor, a touchscreen of a smartphone, etc). Client computing platform(s) 104 may include one or more display devices configured to display the video segments.

Selection component 112 may be configured to receive a selection, via the client computing platform, of the video segment from the multiple video segments. The selection may be received from the user via the client computing platform. The user may select the video segment via a mouse, a touch on and/or near a touchscreen of a smartphone, and/or may select the video segment in other ways. Selection component 112 may be configured to receive a selection for more than one video segment from the multiple video segments. The video segment may include a frame rate. The frame rate may refer to a number of frames (e.g., images) captured per second which compose the video. The frame rate of the high definition and/or original quality video, as discussed above, may include 60, 80, 120, and/or other number of frames per second.

Presentation component 110 may be configured to effectuate presentation, via the display associated with one or more client computing platform(s) 104, of the selected video segment. In some embodiments, presentation component 110 may be configured to effectuate transmission of the selected video segment to one or more client computing platform(s) 104 for presentation. The video segment may be presented at a first resolution. The video segment that may be presented at the first resolution may include a low resolution video. The low resolution video may be of a lower resolution than the high definition and/or original quality video referred to above. For example, if the video segment was captured in 1080p, then the low resolution video may include 720p. In some embodiments, the selected video segment may be presented (e.g., the low resolution video) at a first frame rate. The first frame rate may include 30 frames per second. This is for exemplary purposes only and is not meant to be a limitation of this disclosure. In this manner, system 100 may be configured to retrieve the selected video segment from a storage location in which the selected video segment is stored. Presentation component 110 may be configured to effectuate presentation (and/or effectuate transmission of the video segment to one or more client computing platform(s) 104 for presentation) of the video segment at a lower resolution than originally captured such that a user may view the lower resolution video via the display associated with one or more client computing platform(s) 104.

Selection component 112 may be configured to receive a selection, via one or more client computing platform(s) 104 associated with the display upon which the selected video segment may be displayed, of a point in time during presentation of the video segment to extract a frame set from the video segment at or near the selected point in time. The selection of the point in time may be during the duration of the video segment. For example, as the user views the video segment at the first resolution, the user may wish to view still images (e.g., frames) at or near a particular point in time during the video segment. If the user selects 7.2 seconds into the video segment as the point in time to extract the frame set from the video segment, the user may wish to view the still frames that compose the video segment at or near 7.2 seconds into the video segment. Selection component 112 may be configured to receive the selection of the point in time as 7.2 seconds. The user may make such selection via a mouse, touch sensitive display, and/or other device suitable for user selection associated with one or more client computing platform(s) 104.

System 100 may be configured to receive a selection, via one or more client computing platform(s) 104 that the user may be using to view the video segment, to enter a frame-step mode. The frame-step mode may be selected by a button and/or other selection by the user via one or more client computing platform(s) 104. The selection to enter frame-step mode may indicate to system 100 that the user would like to view individual frames that compose the video segment at or near the selected point in time during the video segment. The selection to enter the frame-step mode may be done during presentation of the video segment, prior to viewing the video segment, and/or at other points in time.

Frame component 114 may be configured to receive the frame set. The frame set may include multiple frames. The frame set may include one frame corresponding to the selected point in time and at least one other frame that corresponds to points in time adjacent to the selected point in time. Frame component 114 may be configured to receive the frame set from the original video segment (e.g., the original quality video). The original video segment may include a second frame rate. The second frame rate may be a higher frame rate than the first frame rate (e.g., the frame rate of the selected video segment as presented that the user may be viewing via the display of one or more client computing platform(s) 104). Referring to the above example, if the original quality video includes a frame rate of 60 frames per second, then 6 frames may have been captured to compose the moving picture (e.g., the video segment) at the point in time of 7.2 seconds into the duration of the video segment. As such, frame component 114 may be configured to receive the frame set including at least the 6 frames that may have been captured to compose the moving picture at 7.2 seconds into the video segment. Additional frames may be included within the frame set. For example, the frame set may include frames from 7.1 seconds and 7.3 seconds into the video segment. The frame set may include 10 frames—the 6 frames from 7.2 seconds, 2 frames prior to those 6 frames, and 2 frames after those 6 frames. This is for illustrative purposes only, as any number of frames at or near the point in time may be included within the frame set that frame component 114 may receive. Presentation component 110 may be configured to resize and/or shrink the frames (e.g., images) after receiving them to avoid taking up too much storage space on server(s) 102 and/or client computing platform(s) 104, and/or to alter the frames (e.g., images) such that they are viewable via one or more client computing platform(s) 104 (e.g., based upon the particular device, etc.).

Presentation component 110 may be configured to effectuate presentation, via the display associated with one or more client computing platform(s) 104, of the frame set. In some embodiments, presentation component 110 may be configured to effectuate transmission of the frame set to one or more client computing platform(s) 104 for presentation. During the frame-step mode, presentation component 110 may be configured to effectuate presentation, via the display associated one or more client computing platform(s) 104, of the frame set including the multiple frames received within the frame set.

Figure 2:
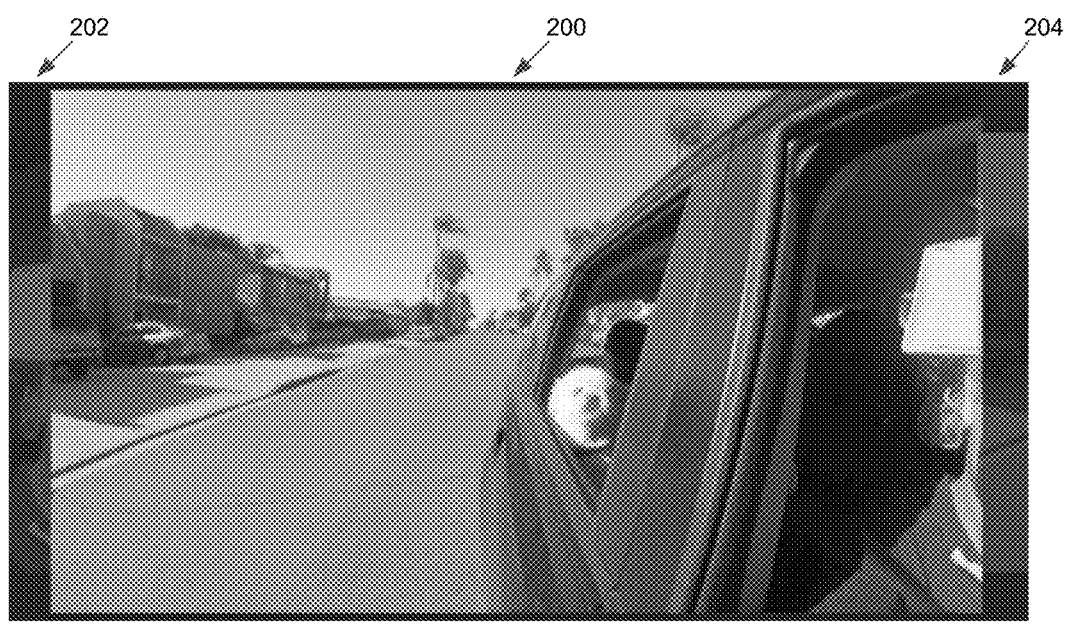
FIGS. 2-4 illustrate exemplary depictions of a user interface with presentation of images from a video segment, in accordance with one or more implementations.

Presentation component 110 may be configured to effectuate presentation, via the display associated with one or more client computing platform(s) 104, of a center frame within the frame set. In some embodiments, presentation component 110 may be configured to effectuate transmission of the center frame within the frame set to one or more client computing platform(s) 104 for presentation. For example, the center frame may be the frame captured at or near 7.2 seconds into the video segment. The frame set may include 11 frames (e.g., frames 427-437). The $6^{th}$ frame within the frame set of 11 frames (e.g., frame 432) may be the center frame. For example, and referring to FIG. 2, center frame 200 may be presented. As shown in FIG. 2, center frame 200 is highlighted, while the other frames (e.g., frames 202 and/or 204) are darkened along the edges of center frame 200 to indicate to the user using system 100 that the user may provide a user selection to advance and/or reverse through the frames, as will be discussed below. The frame set may include 5 frames prior to the center frame (e.g., frames 427-431) and 5 frames after the center frame (e.g., frames 433-437). This frame set (e.g., frames 427-437) may be referred to as an initial frame set. The initial frame set may refer to the original frame set received by frame component 114 upon selection of the point in time within the video segment. This is for illustrative purposes only, as any number of frames may be included within the frame set and/or any number of frames may be included within the frame set prior to the center and/or after the center frame.

Returning to FIG. 1, while presentation component 110 may be configured to effectuate presentation, via the display associated with one or more client computing platform(s)

104, of the center frame, the other frames may be concurrently viewable within a user interface of system 100. For example, the center frame may be enlarged compared to the other frames, though the other frames may be displayed and/or presented within the user interface along with the center frame. In some embodiments, the other frames may not be viewable while the center frame is displayed. In some embodiments, the other frames may be grayed and/or darkened in order to extenuate the center frame being displayed. This is for illustrative purposes only, as any number of frames of the initial frame set may be presented in any manner and/or orientation via presentation component 110.

Figure 3:
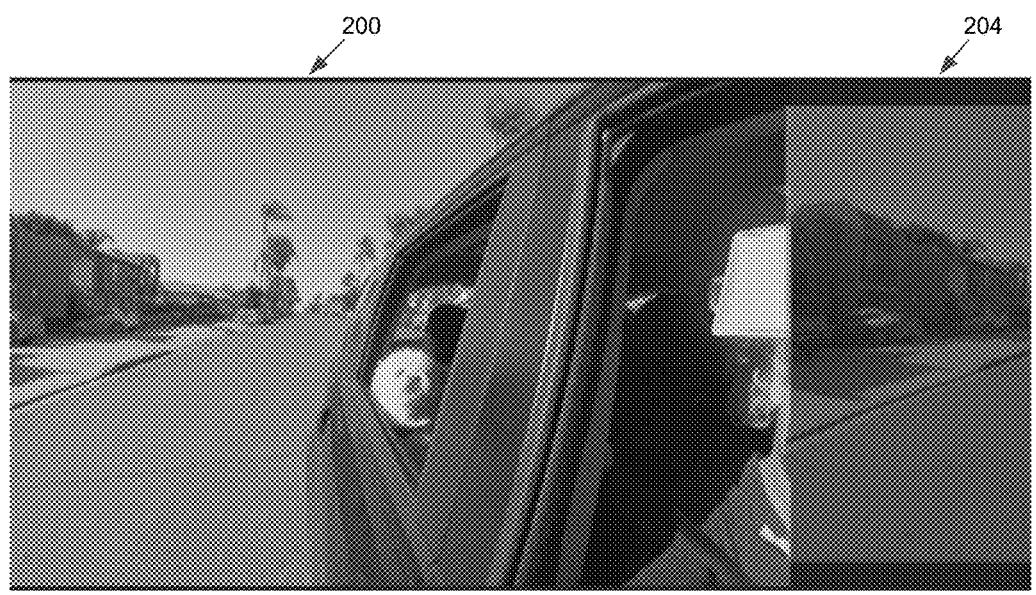
Figure 4:

Selection component 112 may be configured to receive a user selection, via one or more client computing platform(s) 104, to advance through the individual frames of the initial frame set. The selection to advance through the individual frames of the initial frame set may include a selection of a button (e.g., via a mouse, a tap on or near a touch sensitive display, and/or other device associated with one or more client computing platform(s) 104) to advance through the individual frames of the initial frame set, detection of a swiping motion on or near a top surface of a touch sensitive display of one or more client computing platform(s) 104, and/or other selections to indicate that the user would like to view other frames included within the initial frame set other than the center frame. In response to the user selection to advance through the individual frames, selection component 110 may be configured to advance through the individual frames included within the frame set. A single selection to advance through the individual frames may indicate to selection component 110 to advance the center frame by 1. Thus, presentation component 110 may be configured to effectuate presentation, via the display associated with one or more client computing platform(s) 104, of the first frame proceeding the center frame within the frame set (e.g., the initial frame set). For example, referring to FIGS. 1 and 3, selection component 112 may be configured to receive a user selection, via one or more client computing platform(s) 104, to advance through the individual frames of the initial frame set via a swiping motion on and/or near a touch sensitive display of one or more client computing platform(s) 104. If the user swipes from left to right, presentation component 110 may be configured to effectuate presentation of frame 204 as the user swipes from left to right to advance from frame 200 to frame 204. As shown in FIG. 4, upon presentation of frame 204, frame 204 is now highlighted, while the other frames (e.g., frames 200 and/or 206) are darkened along the edges of frame 204 to indicate to the user using system 100 that the user may continue to provide user selections to advance and/or reverse through the frames. Presentation of the first frame, via the user interface, proceeding the center frame within the frame set may be similar to presentation of the center frame as discussed above.

Referring back to FIG. 1, in response to advancing through the individual frames of the frame set (e.g., the initial frame set), frame component 114 may be configured to receive additional frames after and adjacent to the multiple frames included within the frame set (e.g., the initial frame set). Referring to the example above, if in response to the user selection to advance through the individual frames (e.g., advance to the first frame proceeding the center frame), system 100 may be configured to prepare for the user advancing through more of the individual frames of the frame set (e.g., the initial frame set). In this manner, since presentation component 110 may be presenting the first frame after the center frame within the frame set (e.g., the initial frame set), frame component 114 may be configured to receive at least one other frame proceeding the last frame included within the frame set. That is, the next adjacent frame to whichever frame was last included within the initial frame set from the original video segment may be received by frame component 114 and may be added to the frame set in preparation for the user advancing through all of the frames included within the initial frame set. This is for exemplary purposes only and is not meant to be a limitation of this disclosure. For example, if selection component 112 receives a user selection from one or more client computing platform(s) 104 to advance through 3 frames within the initial frame set, frame component 114 may be configured to receive 3 additional frames after and adjacent to the frames included within the initial frame set. In some embodiments, for every frame the user advances through within the initial frame set, frame component 114 may be configured to receive 2, 5, or any other number of additional frames after and adjacent to the frames included within the initial frame set. In this manner, the frames of the original video segment may be "fetched" by frame component 114 such that the individual frames may not take up unnecessary storage space within server(s) 102 and/or one or more client computing platform(s) 104 in response to a user's action to view additional frames in the same "direction" (e.g., advancing through frames of the video segment towards 7.3 seconds may be advancing through frames to the right of the center frame and/or the selected point in time, for example). Additionally, the user may not reach the end of the initial frame set because additional frames may continually be received by frame component 114 in anticipation to display in case the user continues to advance through frames of the initial frame set.

Selection component 112 may be configured to receive a user selection, via one or more client computing platform(s) 104, to reverse through the individual frames of the initial frame set. The selection to reverse through the individual frames of the initial frame set may include a selection of a button (e.g., via a mouse, a tap on or near a touch sensitive display, and/or other device associated with one or more client computing platform(s) 104) to reverse through the individual frames of the initial frame set, detection of a swiping motion on or near a top surface of a touch sensitive display of one or more client computing platform(s), and/or other selections to indicate that the user would like to view other frames included within the initial frame set other than the center frame. In response to the user selection to reverse through the individual frames, selection component 110 may be configured to reverse through the individual frames included within the frame set. A single selection to reverse through the individual frames may indicate to selection component 110 to reverse the center frame by 1. Thus, presentation component 110 may be configured to effectuate presentation, via the display associated with one or more client computing platform(s) 104, of the first frame preceding the center frame within the frame set (e.g., the initial frame set). Presentation of the first frame, via the user interface, preceding the center frame within the frame set may be similar to presentation of the center frame as discussed above.

In response to reversing through the individual frames of the frame set (e.g., the initial frame set), frame component 114 may be configured to receive additional frames before and adjacent to the multiple frames included within the frame set (e.g., the initial frame set). Referring to the example above, if in response to the user selection to reverse through the individual frames (e.g., reverse to the first frame preceding the center frame), system 100 may be configured to prepare for the user reversing through more of the individual frames of the frame set (e.g., the initial frame set). In this manner, since presentation component 110 may be presenting the first frame before the center frame within the frame set (e.g., the initial frame set), frame component 114 may be configured to receive at least one other frame preceding the first frame included within the frame set. That is, the next adjacent frame prior to whichever frame was first included within the initial frame set from the original video segment may be received by frame component 114 and may be added to the frame set in preparation for the user reversing through all of the frames included within the initial frame set. This is for exemplary purposes only and is not meant to be a limitation of this disclosure. For example, if selection component 112 receives a user selection from one or more client computing platform(s) 104 to reverse through 3 frames within the initial frame set, frame component 114 may be configured to receive 3 additional frames before and adjacent to the frames included within the initial frame set. In some embodiments, for every frame the user reverses through within the initial frame set, frame component 114 may be configured to receive 2, 5, or any other number of additional frames before and adjacent to the frames included within the initial frame set. In this manner, the frames of the original video segment may be "fetched" by frame component 114 such that the individual frames may not take up unnecessary storage space within server(s) 102 and/or one or more client computing platform(s) 104 in response to a user's action to view additional frames in the same "direction" (e.g., reversing through frames of the video segment towards 7.1 seconds may be reversing through frames to the left of the center frame and/or the selected point in time, for example). Additionally, the user may not reach the end of the initial frame set because additional frames may continually be received in anticipation to display in case the user continues to reverse through frames of the initial frame set.

Receiving the multiple frames within the frame set may include receiving the multiple frames at a third frame rate. If selection component 112 receives a user selection from one or more client computing platform(s) 104 to advance and/or reverse through the individual frames within the frame set at a particular rate (e.g., the user may continuously advance and/or reverse through an average of 3 frames at a time before pausing to view the displayed frame), frame component 114 may be configured to receive the additional frames at a similar rate (e.g., the next frame received by frame component 114 may be every $3^{rd}$ frame after and/or before the initial frame set, based upon which "direction" the user is advancing and/or reversing through the individual frames).

Selection component 112 may be configured to receive a selection, via one or more client computing platform(s) 104, of a single frame and/or other frames from within the frame set. The selection may be made by the user by selecting the single frame via a mouse, a tap on or near a touch sensitive display, and/or other device (e.g., stylus) associated with one or more client computing platform(s) 104. The selection of the single frame may indicate to system 100 that the user would like to view a high quality image of that particular selection frame of the video segment.

Selection component 112 may be configured to tag (e.g., associate) one or more of a selected single frame (and/or one or more other selected frames), a selected point in time, and/or a point in time during the video segment and/or other video at which point a selected single frame may be located as one or more of a highlight, a key moment, and/or other tag within the video segment and/or other video for later use and/or reference. The tag may be stored with the video segment and/or other video, as metadata associated with the video segment and/or other video, and/or by other techniques. In this manner, the user and/or other users may view the highlight and/or key moment within the video segment while consuming the video segment at a later time. By way of non-limiting illustration, a user may edit together one or more video segments and/or still images to generate an edited video. A point in time within the edited video that may correspond to the selected single frame may include a tag.

Frame component 114 may be configured to receive the single frame and/or other information (e.g., a tag on the frame and/or other information). The single frame may be received from a storage location where the original video segment may be stored (e.g., remotely). In this manner, full size images of the frames of the video segment may not be stored on server(s) 102 and/or client computing platform(s) 104. The single frame may have a second resolution. The second resolution may be higher than the first resolution. That is, the single frame received by frame component 114 may have a higher resolution than the video segment received by video segment component 106. The single frame received by frame component 114 may have a higher resolution than the individual frames included within the frame set. As such, the single frame received by frame component 114 may be considered and/or referred to as a "high quality" image, as the resolution of the single frame may be higher than the presented video segment, the individual frames presented within the frame set, and/or other images/frames/video segments presented to the user via the display associated with one or more client computing platform(s) 104.

Presentation component 110 may be configured to effectuate presentation, via the display associated with one or more client computing platform(s) 104, of the single frame. In some embodiments, presentation component 110 may be configured to effectuate transmission of the single frame to one or more client computing platform(s) 104 for presentation. The user may view the high quality image (e.g., the single frame) via the display associated with one or more client computing platform(s) 104. Presentation component 110 may be configured to effectuate presentation, via the display associated with one or more client computing platform(s) 104, of sharing options for the user to share the high quality image (e.g., the single frame). For example, the user may share the high quality image (e.g., the single frame) to one or more online platforms. An online platform may include a social media outlet and/or other platforms. A social media outlet may include one or more of Facebook, Twitter, Instagram, and/or other social media outlets. The user may select an online platform to share the high quality image during frame extraction (e.g., when the user selected the single frame) and/or may select the online platform to share the high quality image once the high quality image (e.g., the single frame) is received and/or presented via the display associated with one or more client computing platform(s) 104. In some embodiments, system 100 may be configured to store the high quality image within server(s) 102 (e.g., electronic storage 122), locally on one or more client computing platform(s) 104, and/or within other storage devices (e.g., external to server(s) 102 and/or one or more client computing platform(s) 104). The high quality image may be stored prior to sharing, while sharing, and/or after sharing.

In some implementations, presentation component 110 may be configured to effectuate one or more user selected sharing option. By way of non-limiting illustration, presentation component 110 may be configured to receive a selection of the one or more online platforms to distribute one or more high quality images (e.g., one or more selected frames). Presentation component 110 may be configured to effectuate distribution of one or more high quality images to one or more online platforms. By way of non-limiting illustration, presentation component 110 may be configured to effectuate communication of one or more high quality images to the one or more online platforms over a network.

In some implementations, presentation component 110 may be configured to monitor one or more online platforms in response to distribution of one or more high quality images. Monitoring one or more online platforms may include monitoring user interaction with one or more high quality images distributed to the one or more online platforms. In some implementations, user interactions may include one or more of user upvotes on the image, user downvotes on the image, instances of further distribution of the image by users on a given online platform and/or one or more other online platforms (e.g., sharing), commenting on the image, and/or other types of user interaction. In some implementations, presentation component 110 may be configured to, in response to monitoring user interaction, identify one or more users of the one or more online platforms who have interacted with the one or more high quality images distributed to the one or more online platforms.

In some implementations, presentation component 110 may be configured to obtain an edited video and/or other content. The edited video may include at least a portion of a video segment that may include a tag associated with a selected single frame. By way of non-limiting illustration, a user may generate an edited video using editing software that may be provided with and/or made accessible to system 100. In some implementations, an edited video may be obtained at a later point in time from when one or more selected high quality images may have been distributed.

In some implementations, presentation component 110 may be configured to, responsive to obtaining an edited video including one or more portions of one or more video segments that may include one or more tags associated with one or more distributed high quality images, provide access to the edited video for one or more identified users of the one or more online platforms that may have interacted with the one or more high quality images. Providing accessing may include one or more of distributing the edited video to the one or more online platforms, distributing the edited video to the one or more identified users of the one or more online platforms who may have interacted with the one or more high quality images, effectuating communication of one or more notifications to one or more identified users, and/or other operations.

In some implementations, distributing the edited video to one or more identified users may comprise distributing to the one or more identified users via one or more of the one or more online platforms, an external communication (e.g., a text message, an email, and/or other communication), and/or other types of distribution.

In some implementations, effectuating communication of one or more notifications may comprise communicating notifications to the one or more identified users via one or more of the one or more online platforms, an external communication (e.g., a text message and/or other communications), and/or other types of distribution. An some implementations, a notification may include notification information. Notification information may include one or more of a location to consume the edited video (e.g., a link), edited video information (e.g., a title, geolocation information associated with the content of the edited video, and/or other information associated with the edited video), editing-user information (e.g., a name, username, and/or other information associated with a user who generated the edited video), user interaction information (e.g., information identifying the type of user interaction previously engaged in by the user who is receiving the notification), and/or other information. In some implementations, a location to consume the edited video may include one or more of a location within a social media outlet, a location external to the social media outlet, a privately accessible location, a publically accessible location, and/or other locations.

In some implementations, individual notifications may be communicated via one or more online platforms and a location to consume an edited video may not be within the one or more online platforms. In some implementations, individual notifications may be communicated via one or more online platforms and a location to consume a video may be within one or more online platforms. In some implementations, individual notifications may be communicated via one or more external communications and a location to consume a video may be within one or more online platforms.

Referring again to FIG. 1, in some implementations, server(s) 102, client computing platform(s) 104, and/or external resources 120 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 120 may be operatively linked via some other communication media.

A given client computing platform 104 may include one or more processors configured by machine-readable instructions to execute computer program components. The computer program components may be configured to enable a producer and/or user associated with the given client computing platform 104 to interface with system 100 and/or external resources 120, and/or provide other functionality attributed herein to client computing platform(s) 104. By way of non-limiting example, the given client computing platform 104 may include one or more of a desktop computer, a laptop computer, a handheld computer, a NetBook, a Smartphone, a gaming console, and/or other computing platforms.

External resources 120 may include sources of information, hosts and/or providers of virtual environments outside of system 100, external entities participating with system 100, and/or other resources. In some implementations, some or all of the functionality attributed herein to external resources 120 may be provided by resources included in system 100.

Server(s) 102 may include electronic storage 122, one or more processors 124, and/or other components. Server(s) 102 may include communication lines, or ports to enable the exchange of information with a network and/or other computing platforms. Illustration of server(s) 102 in FIG. 1 is not intended to be limiting. Servers(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 122 may include electronic storage media that electronically stores information. The electronic storage media of electronic storage 122 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 122 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 122 may include one or more virtual storage resources (e.g., cloud storage, a virtual private network, and/or other virtual storage resources). Electronic storage 122 may store software algorithms, information determined by processor(s) 124, information received from server(s) 102, information received from client computing platform(s) 104, and/or other information that enables server(s) 102 to function as described herein.

Processor(s) 124 may be configured to provide information processing capabilities in server(s) 102. As such, processor(s) 124 may include one or more of a digital processor, an analog processor, a digital circuit designed to process information, an analog circuit designed to process information, a state machine, and/or other mechanisms for electronically processing information. Although processor(s) 124 is shown in FIG. 1 as a single entity, this is for illustrative purposes only. In some implementations, processor(s) 124 may include a plurality of processing units. These processing units may be physically located within the same device, or processor(s) 124 may represent processing functionality of a plurality of devices operating in coordination. The processor(s) 124 may be configured to execute computer readable instruction components 106, 108, 110, 112, 114, and/or other components. The processor(s) 124 may be configured to execute components 106, 108, 110, 112, 114, and/or other components by software; hardware; firmware; some combination of software, hardware, and/or firmware; and/or other mechanisms for configuring processing capabilities on processor(s) 124.

It should be appreciated that although components 106, 108, 110, 112, and 114 are illustrated in FIG. 1 as being co-located within a single processing unit, in implementations in which processor(s) 124 includes multiple processing units, one or more of components 106, 108, 110, 112, and/or 114 may be located remotely from the other components. The description of the functionality provided by the different components 106, 108, 110, 112, and/or 114 described herein is for illustrative purposes, and is not intended to be limiting, as any of components 106, 108, 110, 112, and/or 114 may provide more or less functionality than is described. For example, one or more of components 106, 108, 110, 112, and/or 114 may be eliminated, and some or all of its functionality may be provided by other ones of components 106, 108, 110, 112, and/or 114. As another example, processor(s) 124 may be configured to execute one or more additional components that may perform some or all of the functionality attributed herein to one of components 106, 108, 110, 112, and/or 114.

Figure 5:
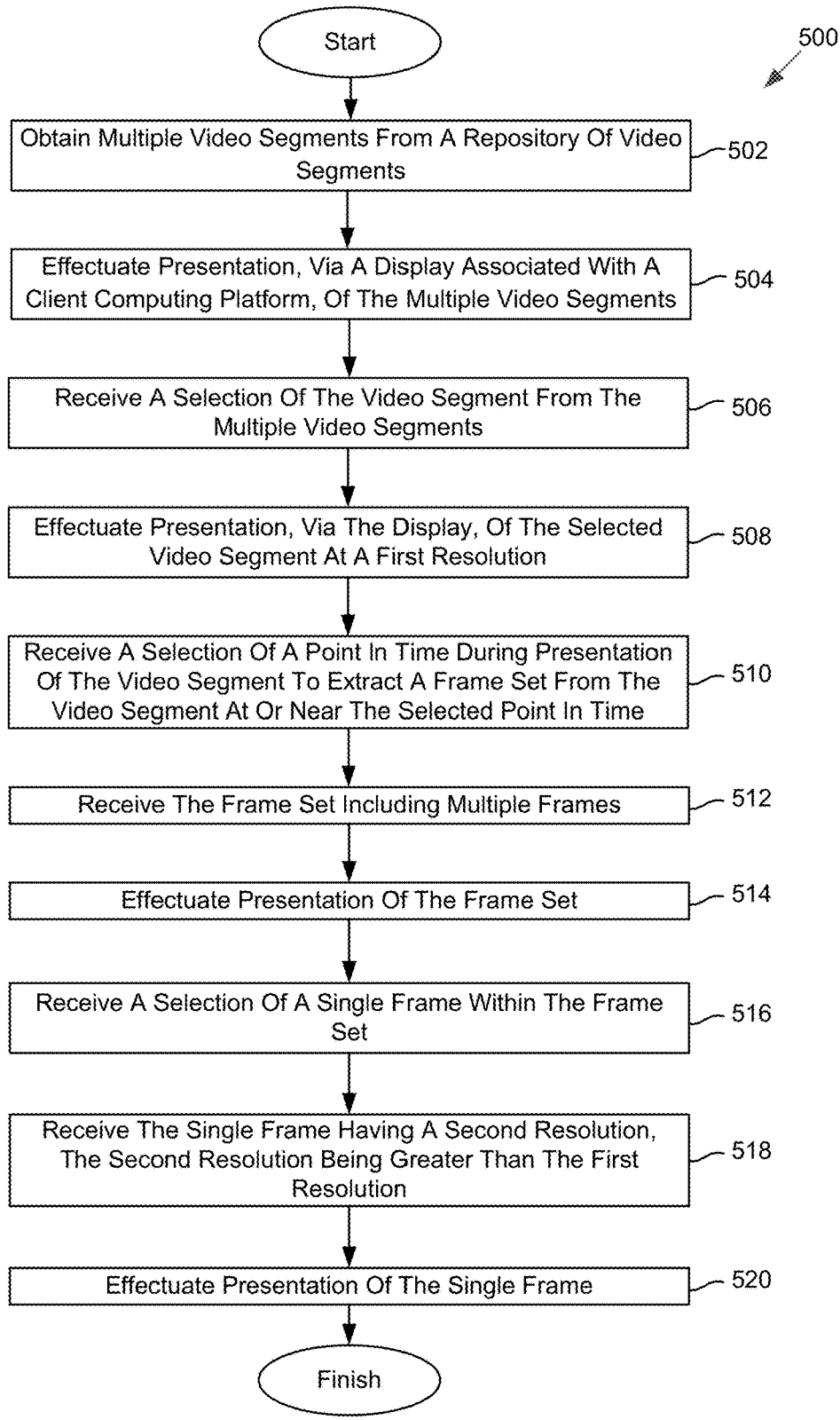
FIGS. 5-6 illustrate methods of receiving a high quality image from a video segment, in accordance with one or more implementations.
Figure 6:
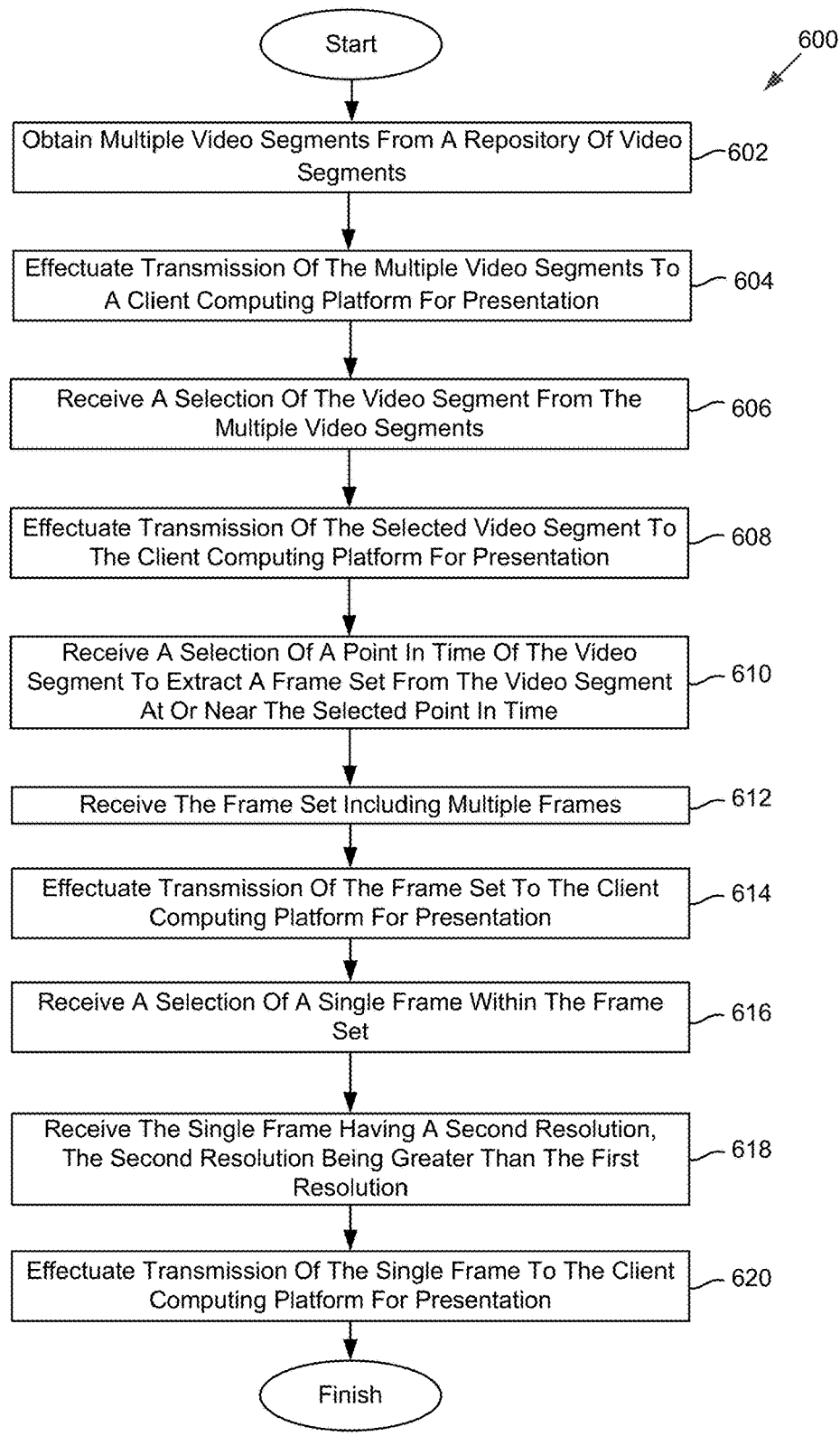

FIGS. 5 and 6 illustrate methods 500 an 600 for receiving a high quality image from a video segment, in accordance with one or more implementations. The operations of methods 500 and 600 presented below are intended to be illustrative. In some implementations, methods 500 and 600 may be accomplished with one or more additional operations not described, and/or without one or more of the operations discussed. Additionally, the order in which the operations of methods 500 and 600 are illustrated in FIGS. 5 and 6 described below are not intended to be limiting.

In some implementations, methods 500 and 600 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of methods 500 and 600 in response to instructions stored electronically on an electronic storage medium. The one or more processing devices may include one or more devices configured through hardware, firmware, and/or software to be specifically designed for execution of one or more of the operations of methods 500 and 600.

At an operation 502, multiple video segments may be obtained from a repository of video segments. Operation 502 may be performed by a video segment component that is the same as or similar to video segment component 106, in accordance with one or more implementations.

At an operation 504, the multiple video segments may be presented. Operation 504 may be performed by a presentation component that is the same as or similar to presentation component 110, in accordance with one or more implementations.

At an operation 506, a selection of a video segment from the multiple video segments may be received. Operation 506 may be performed by a selection component that is the same as or similar to selection component 112, in accordance with one or more implementations.

At an operation 508, the selected video segment may be presented at a first resolution. Operation 508 may be performed by a presentation component that is the same as or similar to presentation component 110, in accordance with one or more implementations.

At an operation 510, a selection of a point in time during presentation of the video segment may be received to extract a frame set from the video segment at or near the selected point in time. Operation 510 may be performed by a selection component that is the same as or similar to selection component 112, in accordance with one or more implementations.

At an operation 512, a frame set may be received. The frame set may include multiple frames, including one frame corresponding to the selected point in time, and other frames that correspond to points in time adjacent to the selected point in time. Operation 512 may be performed by a frame component that is the same as or similar to frame component 114, in accordance with one or more implementations.

At an operation 514, the frame set may be presented. Operation 514 may be performed by a presentation component that is the same as or similar to presentation component 110, in accordance with one or more implementations.

At an operation 516, a selection of a single frame within the frame set may be received. Operation 516 may be performed by a selection component that is the same as or similar to selection component 112, in accordance with one or more implementations.

At an operation 518, the single frame having a second resolution may be received. The second resolution may be greater than the first resolution. Operation 518 may be performed by a frame component that is the same as or similar to frame component 114, in accordance with one or more implementations.

At an operation 520, the single frame may be presented. Operation 520 may be performed by a presentation component that is the same as or similar to presentation component 110, in accordance with one or more implementations.

At an operation 602, multiple video segments may be obtained from a repository of video segments. Operation 602 may be performed by a video segment component that is the same as or similar to video segment component 106, in accordance with one or more implementations.

At an operation 604, the multiple video segments may be transmitted to a client computing platform for presentation. Operation 604 may be performed by a presentation component that is the same as or similar to presentation component 110, in accordance with one or more implementations.

At an operation 606, a selection of a video segment from the multiple video segments may be received. Operation 606 may be performed by a selection component that is the same as or similar to selection component 112, in accordance with one or more implementations.

At an operation 608, the selected video segment may be transmitted to the client computing platform to be presented at a first resolution. Operation 608 may be performed by a presentation component that is the same as or similar to presentation component 110, in accordance with one or more implementations.

At an operation 610, a selection of a point in time of the video segment may be received to extract a frame set from the video segment at or near the selected point in time. Operation 610 may be performed by a selection component that is the same as or similar to selection component 112, in accordance with one or more implementations.

At an operation 612, a frame set may be received. The frame set may include multiple frames, including one frame corresponding to the selected point in time, and other frames that correspond to points in time adjacent to the selected point in time. Operation 612 may be performed by a frame component that is the same as or similar to frame component 114, in accordance with one or more implementations.

At an operation 614, the frame set may be transmitted to the client computing platform for presentation. Operation 614 may be performed by a presentation component that is the same as or similar to presentation component 110, in accordance with one or more implementations.

At an operation 616, a selection of a single frame within the frame set may be received. Operation 616 may be performed by a selection component that is the same as or similar to selection component 112, in accordance with one or more implementations.

At an operation 618, the single frame having a second resolution may be received. The second resolution may be greater than the first resolution. Operation 618 may be performed by a frame component that is the same as or similar to frame component 114, in accordance with one or more implementations.

At an operation 620, the single frame may be transmitted to the client computing platform for presentation. Operation 620 may be performed by a presentation component that is the same as or similar to presentation component 110, in accordance with one or more implementations.

Figure 7:
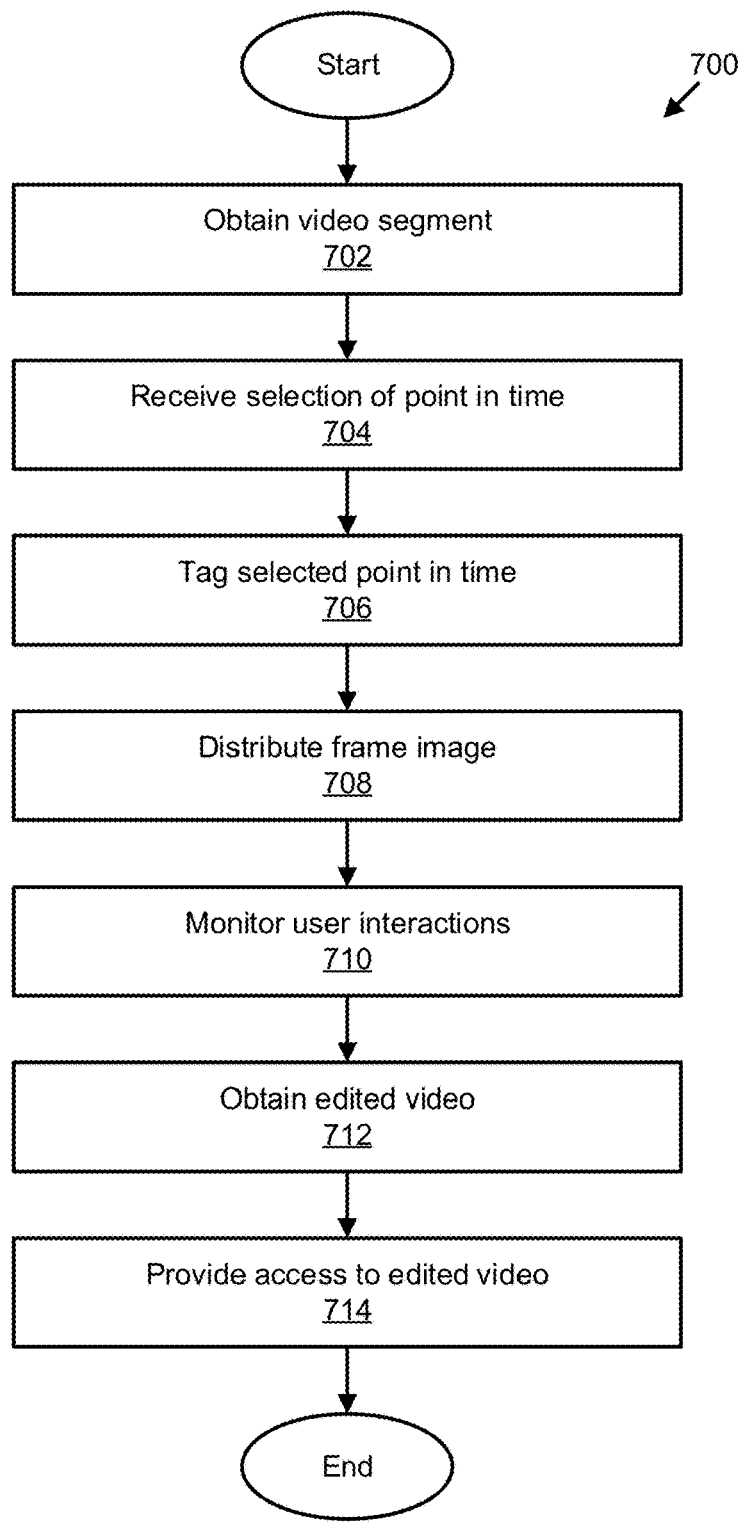
FIG. 7 illustrates a method of providing access to an edited video, in accordance with one or more implementations.

FIG. 7 illustrates method 700 for providing access to an edited video, in accordance with one or more implementations. The operations of method 700 presented below are intended to be illustrative. In some implementations, method 700 may be accomplished with one or more additional operations not described, and/or without one or more of the operations discussed. Additionally, the order in which the operations of method 700 are illustrated in FIG. 7 described below are not intended to be limiting.

In some implementations, method 700 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 700 in response to instructions stored electronically on an electronic storage medium. The one or more processing devices may include one or more devices configured through hardware, firmware, and/or software to be specifically designed for execution of one or more of the operations of method 700.

At an operation 702, a video segment may be obtained. The video segment may have a segment duration. Operation 702 may be performed by one or more physical processors executing a video segment component that is the same as or similar to video segment component 106, in accordance with one or more implementations.

At an operation 704, a selection of a point in time within the segment duration may be received to extract a frame image at or near the selected point in time. Operation 704 may be performed by one or more physical processors executing a selection component that is the same as or similar to selection component 112, in accordance with one or more implementations.

At an operation 706, the point in time within the video segment may be tagged. The frame set may include multiple frames, including one frame corresponding to the selected point in time, and other frames that correspond to points in time adjacent to the selected point in time. Operation 706 may be performed by one or more physical processors executing a selection component that is the same as or similar to selection component 112, in accordance with one or more implementations.

At an operation 708, the frame image may be distributed to one or more online platforms. Operation 708 may be performed by one or more physical processors executing a presentation component that is the same as or similar to presentation component 110, in accordance with one or more implementations.

At an operation 710, user interactions with the frame image on the one or more online platforms may be monitored. The user interactions may be monitored to identify one or more users of the one or more online platforms who may have interacted with the frame image. Operation 710 may be performed by one or more physical processors executing a presentation component that is the same as or similar to presentation component 110, in accordance with one or more implementations.

At an operation 712, an edited video may be obtained. The edited video may include at least a portion of the video segment that may include the tag. Operation 712 may be performed by one or more physical processors executing a presentation component that is the same as or similar to presentation component 110, in accordance with one or more implementations.

At an operation 714, access to the edited video may be provided for one or more identified users of the one or more online platforms who may have interacted with the frame image. Operation 714 may be performed by one or more physical processors executing a presentation component that is the same as or similar to presentation component 110, in accordance with one or more implementations.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for receiving a high quality image from a video segment, the system comprising:
   one or more physical computer processors configured by computer readable instructions to:
      obtain a video segment, the video segment having a first resolution and a first frame rate;
      effectuate presentation, via a display associated with a client computing platform, of a lower quality version of the video segment, the lower quality version of the video segment having a second resolution and a second frame rate, the second resolution lower than the first resolution and the second frame rate lower than the first frame rate;
      receive a selection, via the client computing platform, of a point in time within the lower quality version of the video segment, the selected point in time corresponding to one frame of the lower quality version of the video segment based on the second frame rate of the lower quality version of the video segment and corresponding to multiple frames of the video segment based on the first frame rate of the video segment;
      responsive to the selection of the selected point in time, receive the multiple frames of the video segment corresponding to the selected point in time based on the first frame rate of the video segment;
      reduce resolution of the multiple frames for presentation via the display associated with the client computing platform;
      effectuate presentation, via the display associated with the client computing platform, of the multiple frames to expand presentation of the frames corresponding to the selected point in time;
      receive a selection, via the client computing platform, of a single frame within the multiple frames;
      receive the single frame having a third resolution, the third resolution being higher than the second resolution of the lower quality version of the video segment; and
      effectuate presentation, via the display associated with the client computing platform, of the single frame.

2. The system of claim 1, wherein the one or more physical computer processors are further configured to:
   in response to a user selection, via the client computing platform, to advance through individual frames of the multiple frames, advance through the individual frames included within the multiple frames.

3. The system of claim 2, wherein the one or more physical computer processors are further configured to:
   in response to advancing through the individual frames, receive additional frames after and adjacent to the multiple frames.

4. The system of claim 1, wherein the one or more physical computer processors are further configured to:
   in response to a user selection, via the client computing platform, to reverse through individual frames of the multiple frames, reverse through the individual frames included within the multiple frames.

5. The system of claim 4, wherein the one or more physical computer processors are further configured to:
   in response to reversing through the individual frames, receive additional frames before and adjacent to the multiple frames.

6. The system of claim 1, wherein the third resolution of the single frame is higher than the first resolution of the video segment.

7. The system of claim 1, wherein the single frame is received from a remote location.

8. A method for receiving a high quality image from a video segment, the method comprising:
   obtaining a video segment, the video segment having a first resolution and a first frame rate;
   effectuating presentation, via a display associated with a client computing platform, of a lower quality version of the video segment, the lower quality version of the video segment having a second resolution and a second frame rate, the second resolution lower than the first resolution and the second frame rate lower than the first frame rate;
   receiving a selection, via the client computing platform, of a point in time within the lower quality version of the video segment, the selected point in time corresponding to one frame of the lower quality version of the video segment based on the second frame rate of the lower quality version of the video segment and corresponding to multiple frames of the video segment based on the first frame rate of the video segment;
   responsive to the selection of the selected point in time, receiving the multiple frames of the video segment corresponding to the selected point in time based on the first frame rate of the video segment;
   reducing resolution of the multiple frames for presentation via the display associated with the client computing platform;
   effectuating presentation, via the display associated with the client computing platform, of the multiple frames to expand presentation of the frames corresponding to the selected point in time;
   receiving a selection, via the client computing platform, of a single frame within the multiple frames
   receiving the single frame having a third resolution, the third resolution being higher than the second resolution of the lower quality version of the video segment; and
   effectuating presentation, via the display associated with the client computing platform, of the single frame.

9. The method of claim 8, further comprising:
   in response to a user selection, via the client computing platform, to advance through individual frames of the multiple frames, advancing through the individual frames included within the multiple frames.

10. The method of claim 9, further comprising:
    in response to advancing through the individual frames, receiving additional frames after and adjacent to the multiple frames.

11. The method of claim 8, further comprising:
    in response to a user selection, via the client computing platform, to reverse through individual frames of the multiple frames, reversing through the individual frames included within the multiple frames.

12. The method of claim 11, further comprising:
    in response to reversing through the individual frames, receiving additional frames before and adjacent to the multiple frames.

13. The method of claim 8, wherein the third resolution of the single frame is higher than the first resolution of the video segment.

14. The method of claim 8, wherein the single frame is received from a remote location.

15. The system of claim 1, wherein, responsive to the selection of the selected point in time, one or more frames after and adjacent to the multiple frames and one or more frames before and adjacent to the multiple frames are received.

16. The system of claim 1, wherein the presentation of the multiple frames includes different presentation of a center frame from other frames within the multiple frames, wherein the different presentation of the center frame includes the center frame being enlarged compared to the other frames or the other frames being darkened compared to the center frame.

17. The method of claim 8, wherein, responsive to the selection of the selected point in time, one or more frames after and adjacent to the multiple frames and one or more frames before and adjacent to the multiple frames are received.

18. The method of claim 8, wherein the presentation of the multiple frames includes different presentation of a center frame from other frames within the multiple frames, wherein the different presentation of the center frame includes the center frame being enlarged compared to the other frames or the other frames being darkened compared to the center frame.

\* \* \* \* \*